(12) United States Patent
Mari et al.

(10) Patent No.: US 10,528,477 B2
(45) Date of Patent: Jan. 7, 2020

(54) PSEUDO-INVALIDATING DYNAMIC ADDRESS TRANSLATION (DAT) TABLES OF A DAT STRUCTURE ASSOCIATED WITH A WORKLOAD

(71) Applicant: INTERNATIONAL BUSINESS MACHINES CORPORATION, Armonk, NY (US)

(72) Inventors: Charles E. Mari, Wappingers Falls, NY (US); Steven M. Partlow, Beacon, NY (US); Elpida Tzortzatos, Lagrangeville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 216 days.

(21) Appl. No.: 15/494,618

(22) Filed: Apr. 24, 2017

(65) Prior Publication Data
US 2018/0307618 A1    Oct. 25, 2018

(51) Int. Cl.
*G06F 12/08* (2016.01)
*G06F 12/1009* (2016.01)
*G06F 12/1027* (2016.01)

(52) U.S. Cl.
CPC .......... *G06F 12/1009* (2013.01); *G06F 12/08* (2013.01); *G06F 12/1027* (2013.01);
(Continued)

(58) Field of Classification Search
CPC ............. G06F 12/1009; G06F 12/1027; G06F 2212/683; G06F 2212/655
See application file for complete search history.

(56) References Cited

U.S. PATENT DOCUMENTS

| | | | | | |
|---|---|---|---|---|---|
| 4,484,273 A | * | 11/1984 | Stiffler | ............ | G06F 13/28 710/110 |
| 5,388,244 A | * | 2/1995 | Brent | ............ | G06F 12/08 711/208 |

(Continued)

OTHER PUBLICATIONS

IBM et al.; "Method for Management of Protection and Address Translation Caches."; IP.com; IPCOM000124844D; May 10, 2005.
(Continued)

*Primary Examiner* — Larry T MacKall
(74) *Attorney, Agent, or Firm* — Cantor Colburn LLP; William Kinnaman (57) ABSTRACT

A computer-implemented method includes pseudo-invalidating a first Dynamic Address Translation (DAT) table of a DAT structure associated with a workload. A page fault occurring during translation of a virtual memory address of data required by the workload is detected. Responsive to the page fault, the DAT structure is traversed. The DAT structure includes one or more DAT tables, and each DAT entry in each of the one or more DAT tables is associated with an in-use bit indicating whether the DAT entry is in use. Traversing the DAT structure includes pseudo-invalidating each of one or more DAT entries in the DAT structure that are involved in translating the virtual memory address for which the page fault occurred; and identifying a first page frame referenced by the virtual memory address for which the page fault occurred. The data in the first page frame is processed responsive to the page fault.

14 Claims, 4 Drawing Sheets

(52) U.S. Cl.
CPC ............ *G06F 2212/1024* (2013.01); *G06F 2212/651* (2013.01); *G06F 2212/655* (2013.01); *G06F 2212/683* (2013.01)

(56) References Cited

U.S. PATENT DOCUMENTS

| | | | | |
|---|---|---|---|---|
| 5,506,987 A | * | 4/1996 | Abramson | ............ G06F 9/5033 |
| | | | | 718/103 |
| 7,313,793 B2 | | 12/2007 | Traut et al. | |
| 8,412,911 B2 | | 4/2013 | Grohoski et al. | |
| 9,244,854 B2 | | 1/2016 | Gschwind | |
| 9,244,856 B2 | | 1/2016 | Greiner et al. | |
| 2004/0215919 A1 | * | 10/2004 | Emmes | ............ G06F 12/1009 |
| | | | | 711/208 |
| 2007/0038840 A1 | * | 2/2007 | Hummel | ............ G06F 12/1027 |
| | | | | 711/207 |
| 2007/0074217 A1 | * | 3/2007 | Rakvic | ............ G06F 9/3009 |
| | | | | 718/102 |
| 2009/0064136 A1 | | 3/2009 | Dow et al. | |
| 2009/0172344 A1 | * | 7/2009 | Grochowski | ....... G06F 12/1027 |
| | | | | 711/207 |
| 2009/0313445 A1 | * | 12/2009 | Pandey | ............ G06F 9/4856 |
| | | | | 711/162 |
| 2012/0216012 A1 | * | 8/2012 | Vorbach | ............ G06F 8/443 |
| | | | | 712/11 |
| 2015/0278108 A1 | | 10/2015 | Gschwind | |

OTHER PUBLICATIONS

IBM et al.; "Self Tuning Firmware Algorithm for Allocation of I/O Address Translation Tables"; IP.com; IPCOM000022478D; Mar. 17, 2004.

* cited by examiner

PSEUDO-INVALIDATING DYNAMIC ADDRESS TRANSLATION (DAT) TABLES OF A DAT STRUCTURE ASSOCIATED WITH A WORKLOAD

BACKGROUND

Embodiments of the present invention relate to data processing and, more specifically, to selectively processing data associated with a workload.

In some cases, a computer architecture can include multiple clusters of processor cores for processing data. Each cluster can include one or more processor chips, and each chip can include one or more cores. A workload being processed on the computer architecture may thus be processed by one of these cores.

The computer architecture can also include multiple memory storage devices, each of which can be located closer to some clusters than to others. Because communication is required between a cluster and memory being accessed when processing a workload within that cluster, the allocation of that memory can affect performance. Specifically, the speed of processing data associated with a workload may depend on the location of that data in relation to the location of the workload.

SUMMARY

According to an embodiment of this invention, a computer-implemented method includes pseudo-invalidating a first Dynamic Address Translation (DAT) table of a DAT structure associated with a workload, where pseudo-invalidating the first DAT table includes marking each DAT entry in the first DAT table as invalid. A page fault occurring during translation of a virtual memory address of data required by the workload is detected. Responsive to the page fault, the DAT structure is traversed. The DAT structure is configured to translate virtual memory addresses to physical memory addresses, where the DAT structure includes one or more DAT tables, and each DAT entry in each of the one or more DAT tables is associated with an in-use bit indicating whether the DAT entry is in use. Traversing the DAT structure includes pseudo-invalidating, by a computer processor, each of one or more DAT entries in the DAT structure that are involved in translating the virtual memory address for which the page fault occurred; and identifying a first page frame referenced by the virtual memory address for which the page fault occurred. The data in the first page frame is processed responsive to the page fault occurring during translation of the virtual memory address of the data required by the workload.

In another embodiment, a system includes a memory having computer-readable instructions and one or more processors for executing the computer-readable instructions. The computer-readable instructions include pseudo-invalidating a first DAT table of a DAT structure associated with a workload, where pseudo-invalidating the first DAT table includes marking each DAT entry in the first DAT table as invalid. Further according to the computer-readable instructions, a page fault occurring during translation of a virtual memory address of data required by the workload is detected. Responsive to the page fault, the DAT structure is traversed. The DAT structure is configured to translate virtual memory addresses to physical memory addresses, where the DAT structure includes one or more DAT tables, and each DAT entry in each of the one or more DAT tables is associated with an in-use bit indicating whether the DAT entry is in use. Traversing the DAT structure includes pseudo-invalidating each of one or more DAT entries in the DAT structure that are involved in translating the virtual memory address for which the page fault occurred; and identifying a first page frame referenced by the virtual memory address for which the page fault occurred. The data in the first page frame is processed responsive to the page fault occurring during translation of the virtual memory address of the data required by the workload.

In yet another embodiment, a computer-program product for selectively processing data associated with a workload includes a computer-readable storage medium having program instructions embodied therewith. The program instructions are executable by a processor to cause the processor to perform a method. The method includes pseudo-invalidating a first DAT table of a DAT structure associated with a workload, where pseudo-invalidating the first DAT table includes marking each DAT entry in the first DAT table as invalid. Further according to the method, a page fault occurring during translation of a virtual memory address of data required by the workload is detected. Responsive to the page fault, the DAT structure is traversed. The DAT structure is configured to translate virtual memory addresses to physical memory addresses, where the DAT structure includes one or more DAT tables, and each DAT entry in each of the one or more DAT tables is associated with an in-use bit indicating whether the DAT entry is in use. Traversing the DAT structure includes pseudo-invalidating each of one or more DAT entries in the DAT structure that are involved in translating the virtual memory address for which the page fault occurred; and identifying a first page frame referenced by the virtual memory address for which the page fault occurred. The data in the first page frame is processed responsive to the page fault occurring during translation of the virtual memory address of the data required by the workload.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

The location of data in memory within a computer system can play a role in determining how quickly access to that data occurs. In some systems, memory management can allocate memory closer to a core requesting that memory. However, a workload may be initially dispatched on one core, causing memory to be allocated to that core, and then the workload may be moved to another core. This may occur, for instance, for the purpose of workload balancing or other reasons. If this other core is in a different cluster, accessing the previously allocated memory may take longer than it did previously.

Turning now to an overview of aspects of the present invention, some embodiments utilize selective pseudo-invalidation of entries in a Dynamic Address Translation (DAT) structure, which is used to translate virtual addresses to physical addresses. Specifically, when data is accessed after a related workload has been moved, the DAT entries involved in address translation for accessing that data may be progressively pseudo-invalidated as the DAT structure is traversed. At the end of the traversal, upon reaching a page frame where the data is stored, an available page frame closer to where the workload is being processed may be sought. If such an available page frame is found, the data may be copied to the available page frame.

Additionally, some embodiments use the above methodology of progressive pseudo-invalidation, regardless of whether a workload has moved, to selectively process data associated with that workload. For example, if data related to a workload needs to be processed, such as translated, encrypted, or unencrypted, some embodiments of this invention may perform this processing selectively, only on data that is being accessed, rather than on all data associated with the workload.

Figure 1:
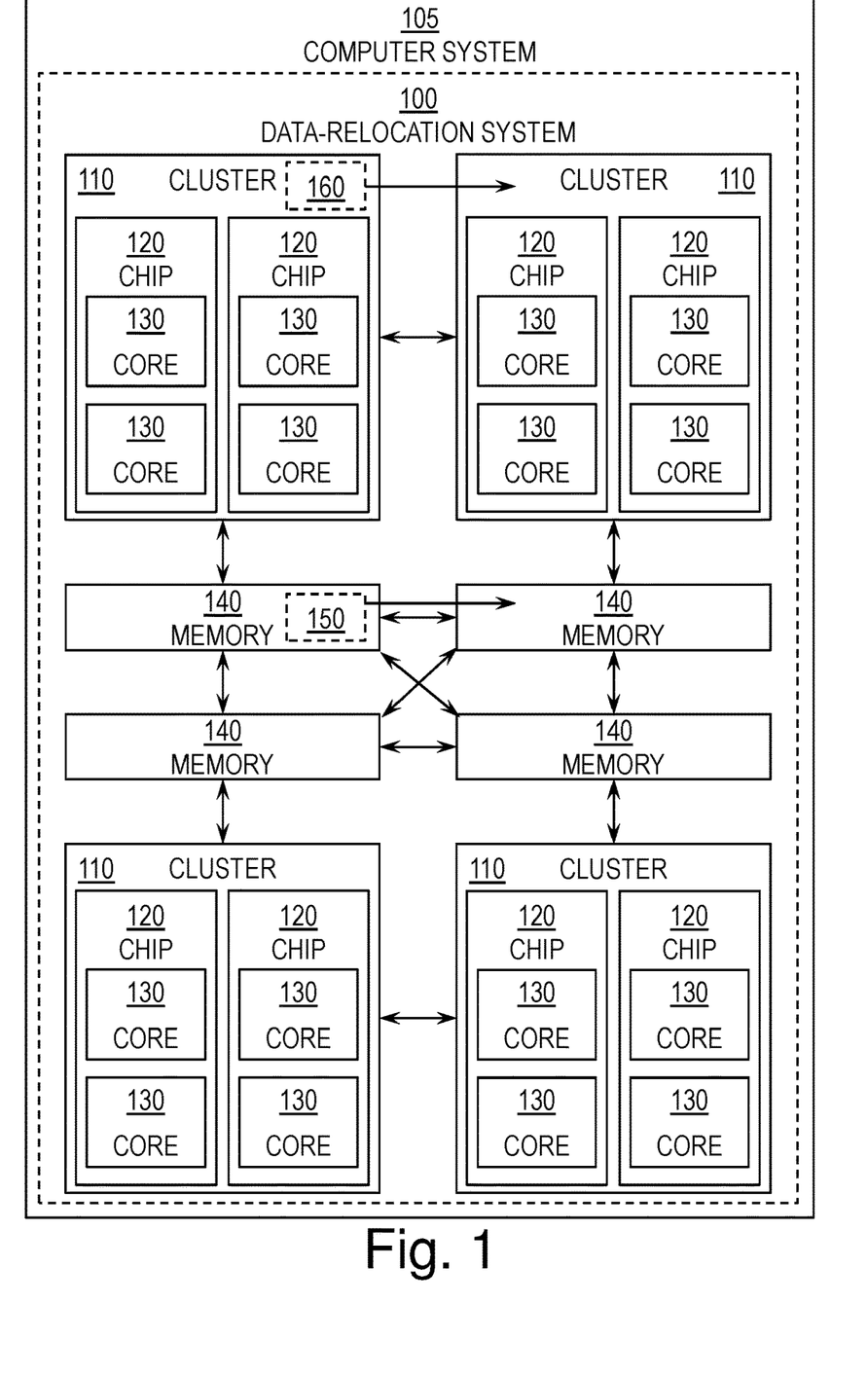
FIG. 1 is a block diagram of a data-processing system, according to some embodiments of this invention.

FIG. 1 is a block diagram of a data-processing system 100 according to some embodiments of this invention. In some embodiments, the data-processing system 100 is integrated with or in communication with a computer system 105 that includes at least two clusters 110. As shown in FIG. 1, each cluster 110 may include at least one chip 120, or processor chip, and each chip 120 may include at least one core 130, or processor core. Additionally, in some embodiments, the computer system 105 includes two or more memories 140, where each memory 140 is a physical memory on the computer system 105 and is accessible by the data-processing system 100. It will be understood, however, that topologies other than that shown in FIG. 1 may also be used with the data-processing system 100.

Generally, because the computer system 105 includes multiple memories 140, some memories 140 will be located closer to a particular cluster 110 than other memories 140. As discussed above, in some embodiments, the data-processing system 100 is configured to relocate data 150 from one memory 140 to another memory 140 based on the location of the cluster 110 processing a workload 160 that accesses that data 150. As shown in FIG. 1, when a workload 160 is moved, associated data 150 may likewise be moved to stay close to that workload 160.

Figure 2:
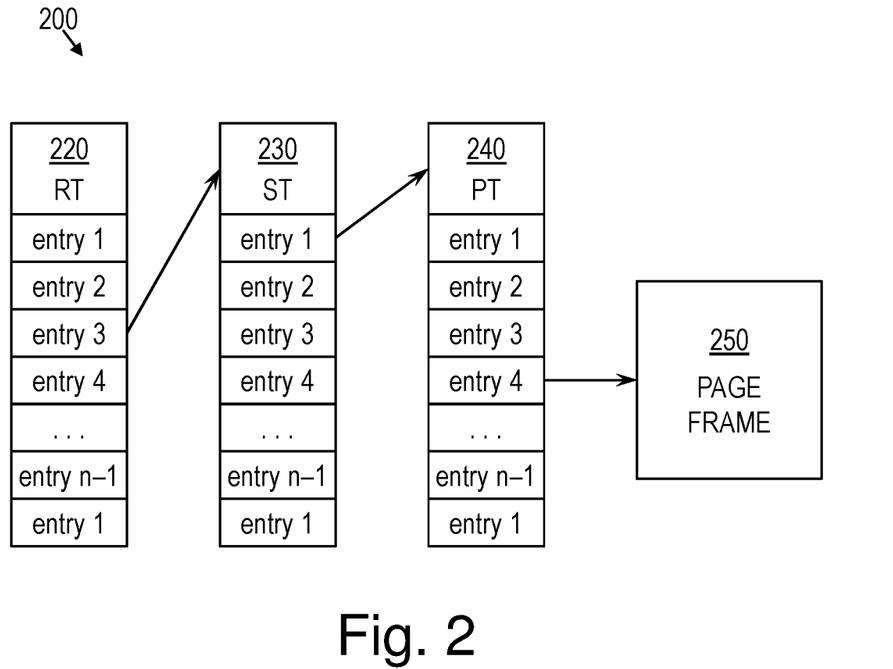
FIG. 2 is a block diagram of a Dynamic Address Translation structure used by the data-processing system, according to some embodiments of this invention.

FIG. 2 illustrates an example DAT structure 200 operated on by the data-processing system 100, according to some embodiments. Each virtual memory address, or virtual address, in the computer system 105 is mapped to a physical memory address, or physical address, generally by indexing through a set of tables in a DAT structure 200. This example DAT structure includes a Region Table (RT) 220, a Segment Table (ST) 230, and a Page Table (PT) 240, and together these tables are used to translate a virtual address of data 150 to the physical address of that data 150 in a page frame 250 of a memory 140. In this disclosure, the term "DAT entry" refers to an entry in any of the tables, such as the RT 220, the ST 230, and the PT 240, making up the DAT structure 200.

When processing circuitry, such as a core 130, needs to access data at a virtual address, the virtual address is translated to a physical address by way of the DAT structure 200. The virtual address determines which entries of the DAT structure 200 to use. In the example shown in FIG. 2, a virtual address of data 150 is translated by using entry 3 in the RT 220, and that entry 3 points to the ST 230, whose entry 1 points to the PT 240, whose entry 4 points to the physical address in the physical page frame 250 where the data 150 is stored.

As described above, in some cases, this is a multi-level translation process in which each table (e.g., the RT 220, the ST 230, and the PT 240) represents a level of translation and is traversed to determine a physical address from a virtual address. There are various reasons why this multi-level translation process may be used. For example, and not by way of limitation, each translation may correspond to a layer of virtualization, and thus multiple levels of translation occur to obtain physical addresses. In this disclosure, the first table within the DAT structure 200 (i.e., the table with which traversals of the DAT structure 200 begin), which is the RT 220 in this example, is referred to as the highest level while the last table, in this case, the PT 240, is also referred to as the lowest level.

Conventionally, a computer system 105 can have a Translation Look-Aside Buffer (TLB), which caches results from recent traversals of the DAT structure 200 to improve performance. A DAT entry can be invalidated in some cases, such as by data being moved or by a change in a mapping between a virtual address and a physical address, for example. When a DAT entry is invalidated, an invalidating instruction is issued to remove the related entries (e.g., the DAT entry itself and other DAT entries referenced directly or indirectly by that DAT entry) from the TLB. These invalidating instructions can be costly to the performance of the computer system 105 because these instructions generally broadcast to all cores 130 of computer system 105. However, according to some embodiments, the number or frequency of these invalidating instructions can be reduced, thus improving system performance.

As mentioned above, there may be circumstances in which a workload is moved from one cluster 110 to another, such as from a first cluster 110 to a second cluster 110. A workload 160 is, for example, work to be performed, where this work may require access to data 150 stored in a memory 140. When the workload 160 is moved to the second cluster 110, it may be that case that the second cluster 110 is farther away from data 150 required by the workload than is the first cluster 110. As a result, if the data 150 does not also move, processing of the workload 160 may slow by virtue of the workload move.

According to some embodiments of this invention, data 150 is moved to be closer to a related workload 160 (e.g., a workload 160 accessing the data 150) while strategically pseudo-invalidating DAT entries so as to avoid unnecessary and costly invalidation instructions to the TLB.

In some embodiments, as will be described in detail below, the data-processing system 100 uses pseudo-invalidation in addition to conventional validation and invalidation of DAT entries. A DAT entry in a pseudo-invalid state may cause a page fault, as with the conventional invalid state, but may still point to another DAT table (e.g., the RT 220, the ST 230, or the PT 240) or to a page frame 250. In contrast, when a DAT entry is conventionally invalidated, that DAT entry does not reference another DAT table or a page frame 250, or if that DAT entry does reference another DAT table or page frame 250, that reference is meaningless and not used by the computer system 105. Conventionally, each DAT entry is associated with an invalidity bit, which indicates whether the associated DAT entry is valid. The invalidity bit is set to TRUE (i.e., invalid) until the first use of that DAT entry, at which point the invalidity bit is unset, or set to FALSE (i.e., valid). In some embodiments, pseudo-invalidation is achieved by using the invalidity bit, or alternatively a validity bit, as well as an in-use bit indicating whether the associated DAT entry is in use. Specifically, for instance, an in-use bit may be set, or valid, or TRUE, when the associated DAT entry has been used for a first time. Thus, a DAT entry may be pseudo-invalidated by marking the DAT entry as invalid and setting the in-use bit. Specifically, in some embodiments, the in-use bit is set the first time an associated DAT entry is written to, and the in-use bit remains unchanged when the associated DAT entry in marked as valid for the purpose of pseudo-invalidation.

Figure 3:
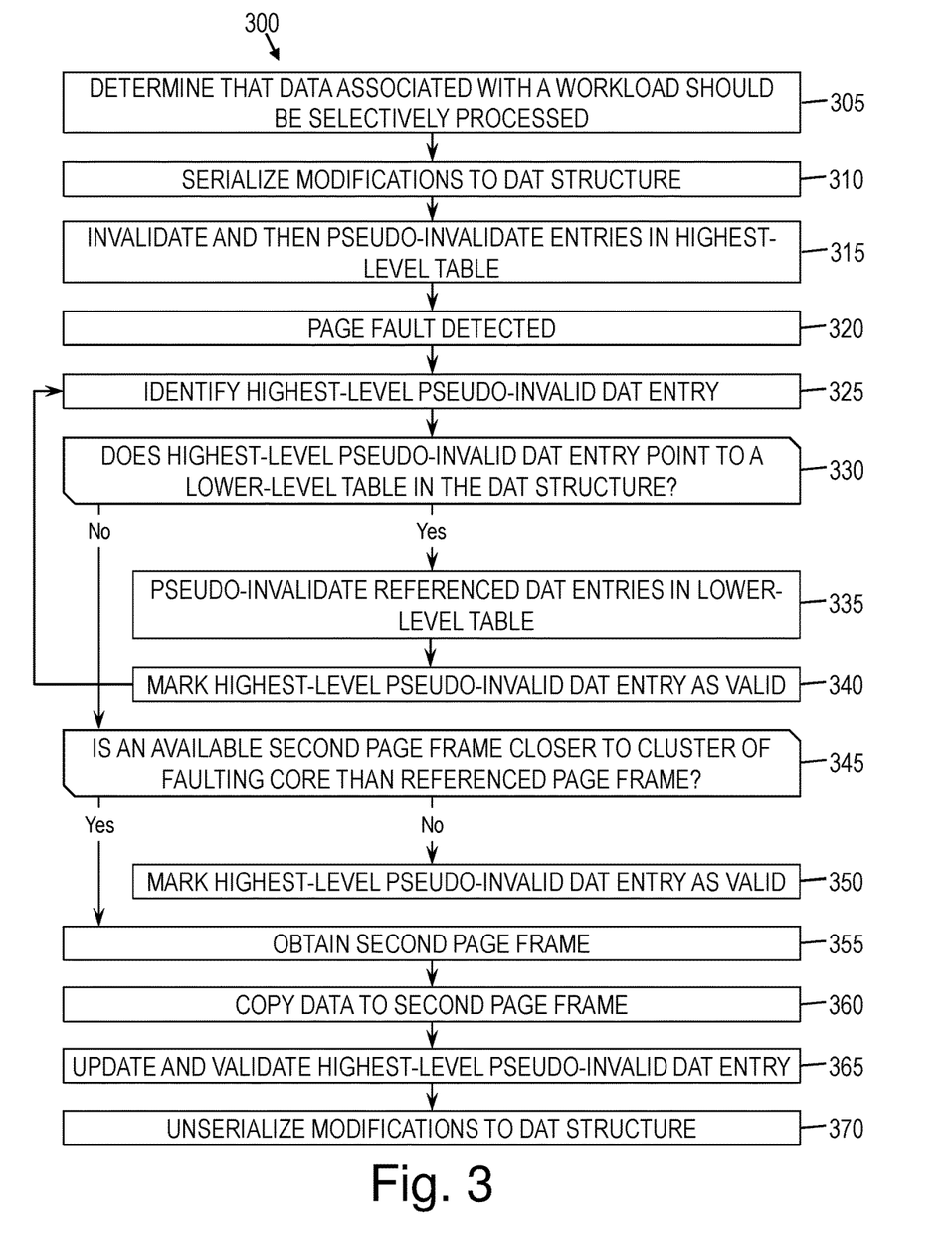
FIG. 3 is a flow diagram of a method for moving data based on movement of a workload, according to some embodiments of this invention.

FIG. 3 is a flow diagram of a method 300 for moving data based on a workload move, according to some embodiments of this invention. As shown in FIG. 3, at block 305, it is determined that data associated with a workload 160 should be selectively processed. For example, and not by way of limitation, this determination may be made because the workload 160 has moved from a first cluster 110 to a second cluster 110. At block 310, modifications to the DAT structure 200 may be serialized, such as by obtaining a lock to synchronize changes to the DAT structure 200.

At block 315, the highest-level table of the DAT structure 200 associated with the workload 160 may be invalidated, and then each entry in that highest-level table may be pseudo-invalidated. (i.e., marked as pseudo-invalid). In some embodiments, the initial invalidation tells the processor circuitry to remove TLB entries associated with the data of the workload 160 that moved. In theory, if an invalidating instruction such as that at block 315 is never received, the TLB could bypass the DAT tables indefinitely and never use the new location of the data. In some embodiments, the pseudo-invalidation then tells an interrupt handler that, while invalid, the DAT entries in the highest-level DAT table still point to next-level DAT tables. Thus, on subsequent page references, a subset of the DAT entries in that DAT table can be revalidated while others in that DAT table stay pseudo-invalid. In some embodiments, the act of pseudo-invalidating includes setting the invalidity bit of each entry in that DAT table to TRUE, thereby marking them as invalid. In this case, the DAT entries that had been used previously would already have their in-use bits set, and would thus be pseudo-invalidated. Due to the in-use bits being set on the previously valid entries of this highest-level DAT table, these particular entries may still reference real page frames 250. Returning to the example of FIG. 2, this includes setting the invalidity bits to TRUE for entries 1 through n of the RT 220.

Referring back to FIG. 3, at block 320, it is detected a page fault occurs. Generally, a page fault occurs when a virtual address is not mapped to a physical address. Specifically, this occurs when a DAT entry used in the translation of the virtual address is deemed invalid, such as due to the applicable invalidity bit being set. At block 325, the highest-level pseudo-invalid DAT entry in the translation leading to the page fault may be identified. The highest-level pseudo-invalid DAT entry is the pseudo-invalid DAT entry that is in the highest-level table from among all the pseudo-invalid DAT entries involved in the translation. At decision block 330, it may be determined whether the highest-level pseudo-invalid DAT entry points to a lower-level DAT table, rather than to a page frame 250.

If the highest-level pseudo-invalid DAT entry points to a lower DAT table, then at block 335, all valid DAT entries in that lower-level DAT table, and referenced by the highest-level pseudo-invalid DAT entry, may be pseudo-invalidated. As discussed above, this may include marking all the applicable DAT entries of that table as invalid, while leaving the in-use bits as they are. At block 340, the highest-level pseudo-invalid DAT entry in the translation may be marked as valid again. Returning to the example of FIG. 2, if the page fault occurs for the page frame 250 referenced by entry 3 of the RT 220, entry 1 of the ST 230, and entry 4 of the PT 240, then each entry in the ST 230 referenced by entry 3 of the RT 220 may be marked as invalid, thereby pseudo-invalidating each such DAT entry that was previously used. Additionally, entry 3 of the RT may be marked as valid. The method 300 of FIG. 3 may then return to block 325. During the next iteration of this operation in the example of FIG. 2, each entry in the PT 240 referenced by entry 1 of the ST 230 may be marked as invalid, thereby pseudo-invalidating each such DAT entry that was previously used, and entry 1 of the ST 230 may be marked as valid.

However, if the highest-level pseudo-invalid DAT entry points to a page frame 250, referred to below as the first page frame 250, then at decision block 345, it may be determined whether an available second page frame 250 is closer to the cluster 110 of the faulting core 130 than is the first page frame 250. If no such available second page frame 250 is identified, then at block 350 the highest-level pseudo-invalid DAT entry may be validated. If such an available second page frame 250 is identified, however, then at block 355 the second page frame 250 may be obtained, as it is closer to the workload 160. At block 360, the data 150 may be copied from the first page frame 250 to the second page frame 250, and the first page frame 250 may be added to the pool of available page frames. At block 365, the highest-level pseudo-invalid DAT entry may be updated to point to the second page frame 250, and that DAT entry may be validated. As a result, the virtual address that caused the page fault now points to the second page frame 250 when translated. In the continuing example of FIG. 2, for instance, entry 4 of the PT 240 may be updated to point to the second page frame 250, and that entry 4 of the PT 240 may also be validated.

At bock 370, modifications to the DAT structure 200 may be unserialized. For instance, the lock obtained may be released.

It will be understood that various embodiments of this invention may be used for purposes other than moving data after a workload 160 has moved. For example, and not by way of limitation, rather than performing blocks 345 through 365 of FIG. 3, the data-processing system 100 may perform some other processing task on the data referenced by the virtual address. Specifically, if it is determined at decision block 330 that the highest-level pseudo-invalid DAT entry points to a page frame 250, referred to as the first page frame 250, then the data-processing system 100 may perform a processing task on the data in that first page frame. This processing may be, for example, translating, encrypting, unencrypting, or moving the data. As a result, according to some embodiments, this processing is performed selectively when an attempt to access the data is made. The example of FIG. 3 is thus an instance of this selective processing, in which data is copied between page frames, which may be initiated in response to a workload 160 having been moved.

Figure 4:
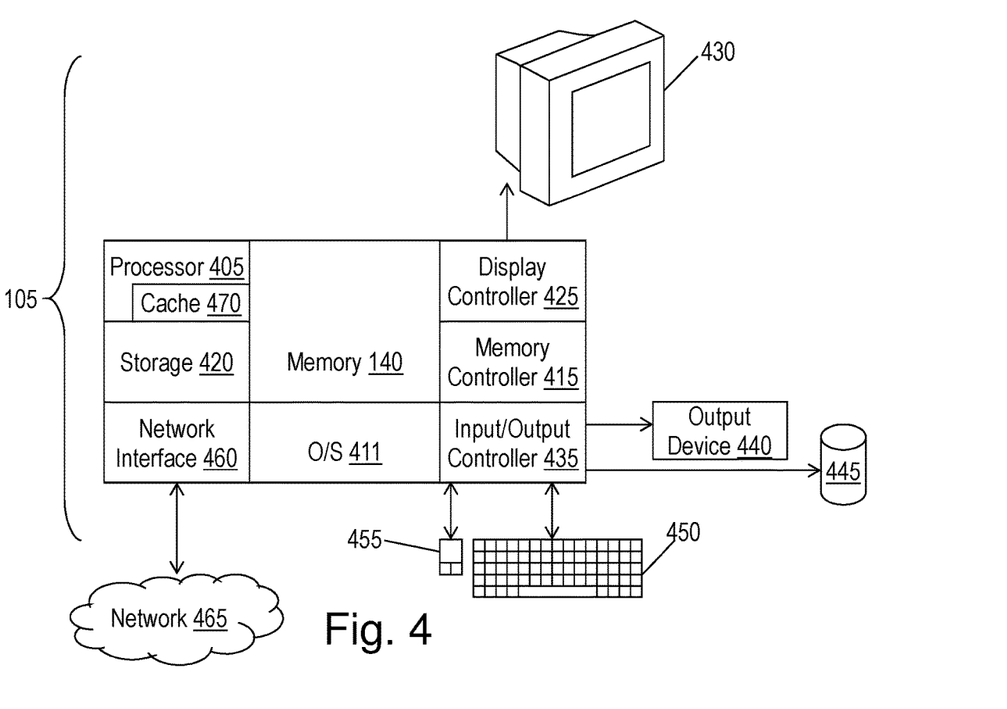
FIG. 4 is a block diagram of a computer system for implementing some or all aspects of the data-processing system, according to some embodiments of this invention.

FIG. 4 illustrates a block diagram of a computer system 105 for use in implementing a data-processing system 100 or method according to some embodiments. The data-processing systems 100 and methods described herein may be implemented in hardware, software (e.g., firmware), or a combination thereof. In some embodiments, the methods described may be implemented, at least in part, in hardware and may be part of the microprocessor of a special or general-purpose computer system 105, such as a personal computer, workstation, minicomputer, or mainframe computer.

In some embodiments, as shown in FIG. 4, the computer system 105 includes a processor 405, memory 140 coupled to a memory controller 415, and one or more input devices 445 and/or output devices 440, such as peripherals, that are communicatively coupled via a local I/O controller 435. These devices 440 and 445 may include, for example, a printer, a scanner, a microphone, and the like. Input devices such as a conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 140. The processor 405 may be a custom made or commercially available processor, a central processing unit (CPU), an auxiliary processor among several processors associated with the computer system 105, a semiconductor based microprocessor (in the form of a microchip or chip set), a macroprocessor, or other device for executing instructions. The processor 405 includes a cache 470, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 may be organized as a hierarchy of more cache levels (L1, L2, etc.).

The memory 140 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 140 may incorporate electronic, magnetic, optical, or other types of storage media. Note that the memory 140 may have a distributed architecture, where various components are situated remote from one another but may be accessed by the processor 405.

The instructions in memory 140 may include one or more separate programs, each of which comprises an ordered listing of executable instructions for implementing logical functions. In the example of FIG. 4, the instructions in the memory 140 include a suitable operating system (OS) 411. The operating system 411 essentially may control the execution of other computer programs and provides scheduling, input-output control, file and data management, memory management, and communication control and related services.

Additional data, including, for example, instructions for the processor 405 or other retrievable information, may be stored in storage 420, which may be a storage device such as a hard disk drive or solid state drive. The stored instructions in memory 140 or in storage 420 may include those enabling the processor to execute one or more aspects of the data-processing systems 100 and methods of this disclosure.

The computer system 105 may further include a display controller 425 coupled to a display 430. In some embodiments, the computer system 105 may further include a network interface 460 for coupling to a network 465. The network 465 may be an IP-based network for communication between the computer system 105 and an external server, client and the like via a broadband connection. The network 465 transmits and receives data between the computer system 105 and external systems. In some embodiments, the network 465 may be a managed IP network administered by a service provider. The network 465 may be implemented in a wireless fashion, e.g., using wireless protocols and technologies, such as WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

Data-processing systems 100 and methods according to this disclosure may be embodied, in whole or in part, in computer program products or in computer systems 105, such as that illustrated in FIG. 4.

Technical effects and benefits of some embodiments include potentially reducing the number and frequency of invalidation instructions on the DAT structure 200 as compared to conventional systems, and potentially reducing data movements. To this end, when a workload is moved, DAT entries are invalidated only as needed, using pseudo-invalidation that preserves references within the DAT structure 200. This can avoid moving data until it is actually accessed, thereby avoiding moving data that is not referenced again. The result is reduced costs spent on invalidations and on copying data between page frames 250. Further, some embodiments allow workloads to continue processing quickly rather than waiting, as in conventional mechanisms, until all associated data has been moved. As an additional benefit, if a workload is returned to a previous location after having been moved, then associated data that was not moved for that workload remains in a beneficial location after the workload returns.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   pseudo-invalidating a first Dynamic Address Translation (DAT) table of a DAT structure associated with a workload, wherein the pseudo-invalidating the first DAT table comprises marking each DAT entry in the first DAT table as invalid;
   detecting a page fault occurring during translation of a virtual memory address of data required by the workload;
   traversing the DAT structure, responsive to the page fault, wherein the DAT structure is configured to translate virtual memory addresses to physical memory addresses, wherein the DAT structure comprises one or more DAT tables, and wherein each DAT entry in each of the one or more DAT tables is associated with an in-use bit indicating whether the DAT entry is in use;
   wherein the traversing comprises:
      pseudo-invalidating, by a computer processor, each of one or more DAT entries in the DAT structure that are involved in translating the virtual memory address for which the page fault occurred; and
      identifying a first page frame referenced by the virtual memory address for which the page fault occurred; and
   processing the data in the first page frame responsive to the page fault occurring during translation of the virtual memory address of the data required by the workload, wherein the pseudo-invalidating the first DAT table of the DAT structure is responsive to detecting that the workload has been moved from a first cluster of processor cores to a second cluster of processor cores and the processing the data in the first page frame responsive to the page fault occurring during translation of the virtual memory address of the data required by the workload comprises:
      identifying a second page frame located closer than the first page frame to the workload that has been moved; and
      copying data from the first page frame to the second page frame, responsive to the workload having been moved and responsive to the page fault.

2. The computer-implemented method of claim 1, wherein a first DAT entry of the first DAT table is associated with a valid in-use bit when pseudo-invalidated.

3. The computer-implemented method of claim 1, wherein the pseudo-invalidating each of one or more DAT entries in the DAT structure that are involved in translating the virtual memory address for which the page fault occurred further comprises iteratively pseudo-invalidating each DAT entry referenced by a higher-level DAT entry involved in translating the virtual memory address for which the page fault occurred.

4. The computer-implemented method of claim 3, wherein the iteratively pseudo-invalidating each DAT entry referenced by a higher-level DAT entry involved in translating the virtual memory address for which the page fault occurred comprises, for a first DAT entry of the one or more DAT entries in the DAT structure that are involved in translating the virtual memory address for which the page fault occurred:
   identifying a lower-level DAT entry involved in translating the virtual memory address for which the page fault occurred;
   pseudo-invalidating the lower-level DAT entry; and
   validating the first DAT entry.

5. The computer-implemented method of claim 1, wherein the pseudo-invalidating each of the one or more DAT entries that are involved in translating the virtual memory address for which the page fault occurred comprises marking each of the one or more DAT entries as invalid.

6. A system comprising:
   a memory having computer-readable instructions; and
   one or more processors for executing the computer-readable instructions, the computer-readable instructions comprising:
      pseudo-invalidating a first Dynamic Address Translation (DAT) table of a DAT structure associated with a workload, wherein the pseudo-invalidating the first DAT table comprises marking each DAT entry in the first DAT table as invalid;
      detecting a page fault occurring during translation of a virtual memory address of data required by the workload;
      traversing the DAT structure, responsive to the page fault, wherein the DAT structure is configured to translate virtual memory addresses to physical memory addresses, wherein the DAT structure comprises one or more DAT tables, and wherein each DAT entry in each of the one or more DAT tables is associated with an in-use bit indicating whether the DAT entry is in use;
      wherein the traversing comprises:
         pseudo-invalidating each of one or more DAT entries in the DAT structure that are involved in translating the virtual memory address for which the page fault occurred; and
         identifying a first page frame referenced by the virtual memory address for which the page fault occurred; and
      processing the data in the first page frame responsive to the page fault occurring during translation of the virtual memory address of the data required by the workload, wherein the pseudo-invalidating the first DAT table of the DAT structure is responsive to detecting that the workload has been moved from a first cluster of processor cores to a second cluster of processor cores and the processing the data in the first page frame responsive to the page fault occurring during translation of the virtual memory address of the data required by the workload comprises:
identifying a second page frame located closer than the first page frame to the workload that has been moved; and
copying data from the first page frame to the second page frame, responsive to the workload having been moved and responsive to the page fault.

7. The system of claim 6, wherein a first DAT entry of the first DAT table is associated with a valid in-use bit when pseudo-invalidated.

8. The system of claim 6, wherein the pseudo-invalidating each of one or more DAT entries in the DAT structure that are involved in translating the virtual memory address for which the page fault occurred further comprises iteratively pseudo-invalidating each DAT entry referenced by a higher-level DAT entry involved in translating the virtual memory address for which the page fault occurred.

9. The system of claim 8, wherein the iteratively pseudo-invalidating each DAT entry referenced by a higher-level DAT entry involved in translating the virtual memory address for which the page fault occurred comprises, for a first DAT entry of the one or more DAT entries in the DAT structure that are involved in translating the virtual memory address for which the page fault occurred:
identifying a lower-level DAT entry involved in translating the virtual memory address for which the page fault occurred;
pseudo-invalidating the lower-level DAT entry; and
validating the first DAT entry.

10. The system of claim 6, wherein the pseudo-invalidating each of the one or more DAT entries that are involved in translating the virtual memory address for which the page fault occurred comprises marking each of the one or more DAT entries as invalid.

11. A computer-program product for selectively processing data associated with a workload, the computer-program product comprising a computer-readable storage medium having program instructions embodied therewith, the program instructions executable by a processor to cause the processor to perform a method comprising:
pseudo-invalidating a first Dynamic Address Translation (DAT) table of a DAT structure associated with a workload, wherein the pseudo-invalidating the first DAT table comprises marking each DAT entry in the first DAT table as invalid;
detecting a page fault occurring during translation of a virtual memory address of data required by the workload;
traversing the DAT structure, responsive to the page fault, wherein the DAT structure is configured to translate virtual memory addresses to physical memory addresses, wherein the DAT structure comprises one or more DAT tables, and wherein each DAT entry in each of the one or more DAT tables is associated with an in-use bit indicating whether the DAT entry is in use;
wherein the traversing comprises:
pseudo-invalidating each of one or more DAT entries in the DAT structure that are involved in translating the virtual memory address for which the page fault occurred; and
identifying a first page frame referenced by the virtual memory address for which the page fault occurred; and
processing the data in the first page frame responsive to the page fault occurring during translation of the virtual memory address of the data required by the workload, wherein the pseudo-invalidating the first DAT table of the DAT structure is responsive to detecting that the workload has been moved from a first cluster of processor cores to a second cluster of processor cores and the processing the data in the first page frame responsive to the page fault occurring during translation of the virtual memory address of the data required by the workload comprises:
identifying a second page frame located closer than the first page frame to the workload that has been moved; and
copying data from the first page frame to the second page frame, responsive to the workload having been moved and responsive to the page fault.

12. The computer-program product of claim 11, wherein a first DAT entry of the first DAT table is associated with a valid in-use bit when pseudo-invalidated.

13. The computer-program product of claim 11, wherein the pseudo-invalidating each of one or more DAT entries in the DAT structure that are involved in translating the virtual memory address for which the page fault occurred further comprises iteratively pseudo-invalidating each DAT entry referenced by a higher-level DAT entry involved in translating the virtual memory address for which the page fault occurred.

14. The computer-program product of claim 13, wherein the iteratively pseudo-invalidating each DAT entry referenced by a higher-level DAT entry involved in translating the virtual memory address for which the page fault occurred comprises, for a first DAT entry of the one or more DAT entries in the DAT structure that are involved in translating the virtual memory address for which the page fault occurred:
identifying a lower-level DAT entry involved in translating the virtual memory address for which the page fault occurred;
pseudo-invalidating the lower-level DAT entry; and
validating the first DAT entry.

* * * * *